United States Patent
Shmueli Friedland et al.

(10) Patent No.: US 12,252,014 B2
(45) Date of Patent: Mar. 18, 2025

(54) VEHICLE DISPLAY CONTROL FOR COLOR-IMPAIRED VIEWERS

(71) Applicant: GM GLOBAL TECHNOLOGY OPERATIONS LLC, Detroit, MI (US)

(72) Inventors: Yael Shmueli Friedland, Tel Aviv (IL); Asaf Degani, Tel Aviv (IL); Dan Levi, Ganei Tikvah (IL); Tzvi Philipp, Bet Shemesh (IL); Eran Kishon, Hod Hasharon (IL)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 17/984,416

(22) Filed: Nov. 10, 2022

(65) Prior Publication Data
US 2024/0157791 A1    May 16, 2024

(51) Int. Cl.
*B60K 35/00* (2024.01)
*B60K 35/29* (2024.01)
(Continued)

(52) U.S. Cl.
CPC .............. *B60K 35/00* (2013.01); *B60K 35/29* (2024.01); *B60K 35/65* (2024.01); *B60K 35/80* (2024.01); *B60K 35/81* (2024.01); *B60K 35/90* (2024.01); *B60K 2360/188* (2024.01); *B60K 2360/56* (2024.01); *B60K 2360/731* (2024.01)

(58) Field of Classification Search
CPC ........ B60K 35/00; B60K 35/29; B60K 35/65; B60K 35/80; B60K 35/81; B60K 35/90; B60K 35/22; B60K 2360/188; B60K 2360/56; B60K 2360/731; B60K 2360/111; B60K 2360/338; B60K 2360/782;
(Continued)

(56) References Cited

U.S. PATENT DOCUMENTS

| 2004/0212546 A1* | 10/2004 | Dixon | ................ H04N 21/4854 |
| | | | 348/E5.12 |
| 2006/0061586 A1* | 3/2006 | Brulle-Drews | ..... G06F 3/04897 |
| | | | 345/594 |

(Continued)

OTHER PUBLICATIONS

Attard et al, C. Chrovision and True Colour: Applications for Colour Impaired Persons, IEEE, 2019 11th International Symposium on Image and Signal Processing and Analysis (ISPA), Sep. 2019, pp. 360-365. (Year: 2019).*

(Continued)

*Primary Examiner* — Russell Frejd
(74) *Attorney, Agent, or Firm* — Quinn IP Law

(57) ABSTRACT

A method of controlling a color display screen aboard a motor vehicle includes performing, via a host computer, a color calibration test of a user of the motor vehicle in which the user is subjected to a calibrated set of color-coded test information. The method includes receiving a color perception response of the user to the calibrated set of color-coded test information via the host computer. Additionally, the method includes mapping a reduced visual gamut of the user via the host computer using the color perception response, and then commanding adjustment of user-specific color settings of the motor vehicle using the reduced visual gamut to thereby accommodate a color perception deficiency of the user.

20 Claims, 4 Drawing Sheets

(51) Int. Cl.
*B60K 35/65* (2024.01)
*B60K 35/80* (2024.01)
*B60K 35/81* (2024.01)
*B60K 35/90* (2024.01)

(58) Field of Classification Search
CPC ........ G09G 5/02; G09G 3/001; G09G 3/2003; G09G 2320/0666; G09G 2380/10
See application file for complete search history.

(56) References Cited

U.S. PATENT DOCUMENTS

| | | | |
|---|---|---|---|
| 2006/0139312 A1* | 6/2006 | Sinclair, II | G06F 3/0481 |
| | | | 345/156 |
| 2013/0147827 A1* | 6/2013 | Kurkure | G09G 5/14 |
| | | | 345/589 |
| 2018/0043257 A1* | 2/2018 | Stevens | G06T 11/60 |
| 2021/0074238 A1* | 3/2021 | Ward | G09G 3/3208 |
| 2021/0261050 A1* | 8/2021 | Sobhany | B60Q 3/80 |
| 2022/0366131 A1* | 11/2022 | Ekron | G06F 16/951 |
| 2022/0392420 A1* | 12/2022 | Harwell | G09G 5/06 |
| 2023/0032425 A1* | 2/2023 | Ekron | G06F 40/151 |
| 2023/0169734 A1* | 6/2023 | Alexander | G06T 19/006 |
| | | | 345/633 |

OTHER PUBLICATIONS

Schmitt et al, S. Mobile Services Supporting Color Vision Deficiency, IEEE, 2012 13th International Conference on Optimization of Electrical and Electronic Equipment (OPTIM), May 2012, pp. 1413-1420. (Year: 2012).*

* cited by examiner

VEHICLE DISPLAY CONTROL FOR COLOR-IMPAIRED VIEWERS

INTRODUCTION

The present disclosure relates to automated systems and methodologies for controlling a color display within a vehicle interior in a manner that allows color-impaired viewers to accurately visualize color-coded information during vehicle operation.

Common color perception deficiencies include protanomaly, deuteranomaly, and tritanomaly. Protanomaly is an anomalous response of certain cones in the human retina to light having a relatively long wavelength. The sensitive retina cones are thus referred to in the art as L-cones, with "L" corresponding to "long". Deuteranomaly is an anomalous response to medium wavelength light by M-cones of the retina. Tritanomaly in turn is an anomalous response to short wavelength light by the retina's associated S-cones. An individual with color vision deficiencies of the above or other types may be unable to accurately differentiate between certain colors located along a color confusion line within a color space chromaticity diagram. Such users, for example, may not be able to distinguish a green numeral when displayed on a red background of an Ishihara Color Plate test often used to detect protanopia, deuteranopia, and monochromacy.

Automotive vehicles are exemplary systems configured to display a wide variety of information to drivers and passengers ("users") within a vehicle interior. For example, information may be displayed via an instrument panel or instrument cluster, on a center stack/infotainment screen, via a heads-up display (UD) system, on rear-view or side-view mirrors, or on other surfaces of the vehicle interior. While the displayed information is often alphanumeric or symbolic in nature, some of the displayed information may also be color-coded to imbue the information with a specific meaning, urgency, or criticality. Color-coded information and alerts, however, may not be perceived as intended when a given user's ability to perceive the full color spectrum is deficient.

SUMMARY

Disclosed herein are automated systems and methods for controlling the display of color-coded information within a vehicle interior in a manner that accommodates color perception deficiencies of drivers or passengers ("users") of a motor vehicle, and to ultimately help such users accurately perceive the color-dependent meaning of the displayed information.

In particular, a method for controlling a color display screen located within a vehicle interior includes performing, via a host computer, a color calibration test in which a user is subjected to or presented with a calibrated set of color-coded test information. The method in this exemplary embodiment includes receiving a color perception response of the user to the color-coded test information, via the host computer, and mapping a reduced visual gamut of the user using the user's color perception response. In this representative implementation, the method also includes commanding an adjustment of user-specific color settings using the reduced visual gamut to thereby accommodate a color perception deficiency of the user.

Performing the color calibration test in one or more embodiments may include presenting the color-coded test information to the user via a color display screen, e.g., of a vehicle display or a user device possibly being in remote communication with the host computer. This action could include displaying a sequence of color-coded symbols or graphics on the color display screen of the user device, for instance as standard red, green, blue (sRGB) symbols or graphics.

In one or more embodiments, mapping of the reduced visual gamut of the user may be performed using a Daltonization algorithm.

The method described herein may also include selectively augmenting the reduced visual gamut via the host computer using non-color-based settings or information, and thereafter outputting "non-color-based" settings to a display controller in conjunction with the user-specific color settings. Exemplary non-limiting non-color-based information include a size, shape, font, intensity, and/or texture in one or more embodiments.

A motor vehicle as contemplated herein could optionally include a steering wheel having an adjustable light bar, i.e., having one or more adjustable characteristics such as color, length, width, intensity, etc. In such an embodiment, adjusting the user-specific color settings may include commanding adjustment of a color setting of the adjustable light bar. The motor vehicle may include an instrument panel or cluster, such that commanding the adjustment of the user-specific color settings includes commanding an adjustment to a color setting of the instrument panel or cluster. Likewise, the motor vehicle may include an infotainment display screen. In such a configuration, commanding the adjustment of the user-specific color settings includes commanding an adjustment to a color setting of the infotainment display screen.

Commanding the adjustment to the user-specific color settings may also include storing user-specific color settings in a memory device of a display controller of the motor vehicle.

Another aspect of the disclosure includes a non-transitory, computer-readable storage medium on which is recorded an instruction set executable by a processor. In this embodiment, executing the instruction set causes the processor to perform a color calibration test during which a potential user of a motor vehicle is subjected to a calibrated set of color-coded test information, and to receive a color perception response of the user to the calibrated set of color-coded test information. Likewise, execution of the instruction set causes the host computer to map a reduced visual gamut of the user using the color perception response, and to command adjustment of user-specific color settings aboard the motor vehicle using the reduced visual gamut, thereby accommodating a color perception deficiency of the user.

The method in accordance with yet another possible implementation includes performing, via a host computer, a color calibration test of a user of the motor vehicle in which the user is subjected to a calibrated set of color-coded test information, including presenting the calibrated set of color-coded test information to the user via a color display screen of the motor vehicle or a user device in remote communication with the host computer. The color-coded test information in this non-limiting example implementation of the method includes sRGB graphics or images. Additionally, the method includes receiving a color perception response of the user to the calibrated set of color-coded test information via the host computer, mapping a reduced visual gamut of the user via the host computer using the color perception response using a Daltonization algorithm, and commanding an adjustment of user-specific color settings of the motor vehicle using the reduced visual gamut to thereby accommodate a color perception deficiency of the user.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
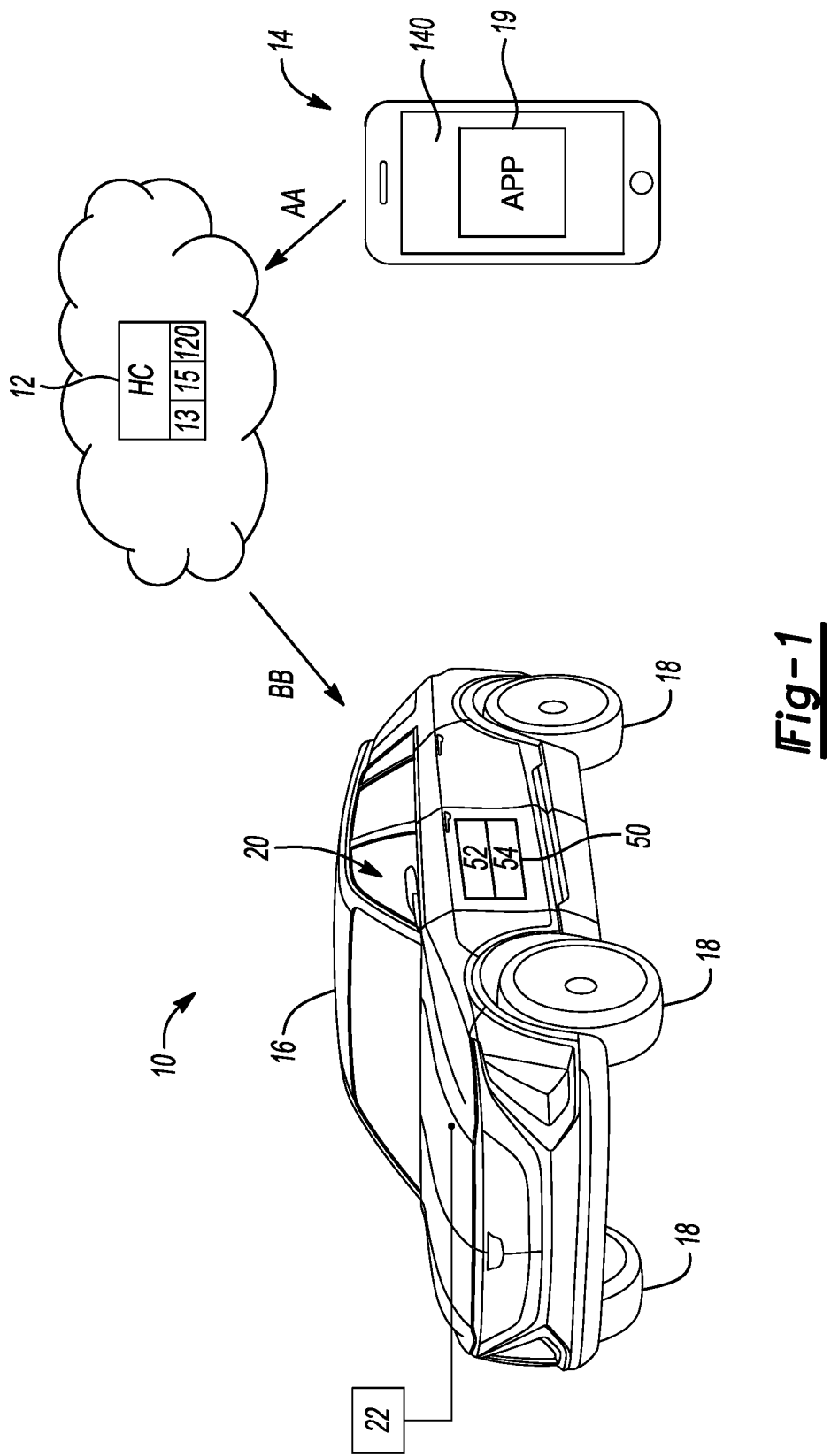
FIG. 1 illustrates a motor vehicle, a host computer, and a user device collectively configured for use in performing a method in accordance with the present disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

As noted above, automotive vehicles display a wide variety of information to drivers and passengers ("users") within a vehicle interior. The meaning of color-coded information and alerts, however, may not be perceived as intended when a given user's ability to perceive the full color spectrum is impaired or deficient. The present solutions are therefore directed toward facilitating in-vehicle color perception for such users to optimize the in-vehicle experience, particularly when viewing displayed color-coded information within the vehicle interior.

Referring to the drawings, wherein like reference numbers refer to like features throughout the several views, FIG. 1 depicts a motor vehicle 10, a host computer 12, and a user device 14. The motor vehicle 10 includes a vehicle body 16 and road wheels 18 connected thereto. The vehicle body 16, e.g., a sedan, coupe, truck, crossover, or other configuration, defines a vehicle interior 20 having one or more color display screens 22, with an exemplary embodiment of the vehicle interior 20 and the color display screens 22 depicted in FIG. 2 and described below. The motor vehicle 10 of FIG. 1 also includes an onboard display controller 50, which as contemplated herein is equipped to display color-coded information to drivers and passengers ("users") seated within the vehicle interior 20.

As appreciated in the art and noted above, automotive vehicles such as the representative motor vehicle 10 of FIG. 1 frequently display information in particular colors, with the displayed color imparting a certain level of urgency, criticality, or meaning to the presented information. A user having color-impaired vision, however, may not be able to distinguish displayed colors of such color-coded information from surrounding colors, thus leaving the user unable to accurately discern the importance of the displayed information.

Figure 4:
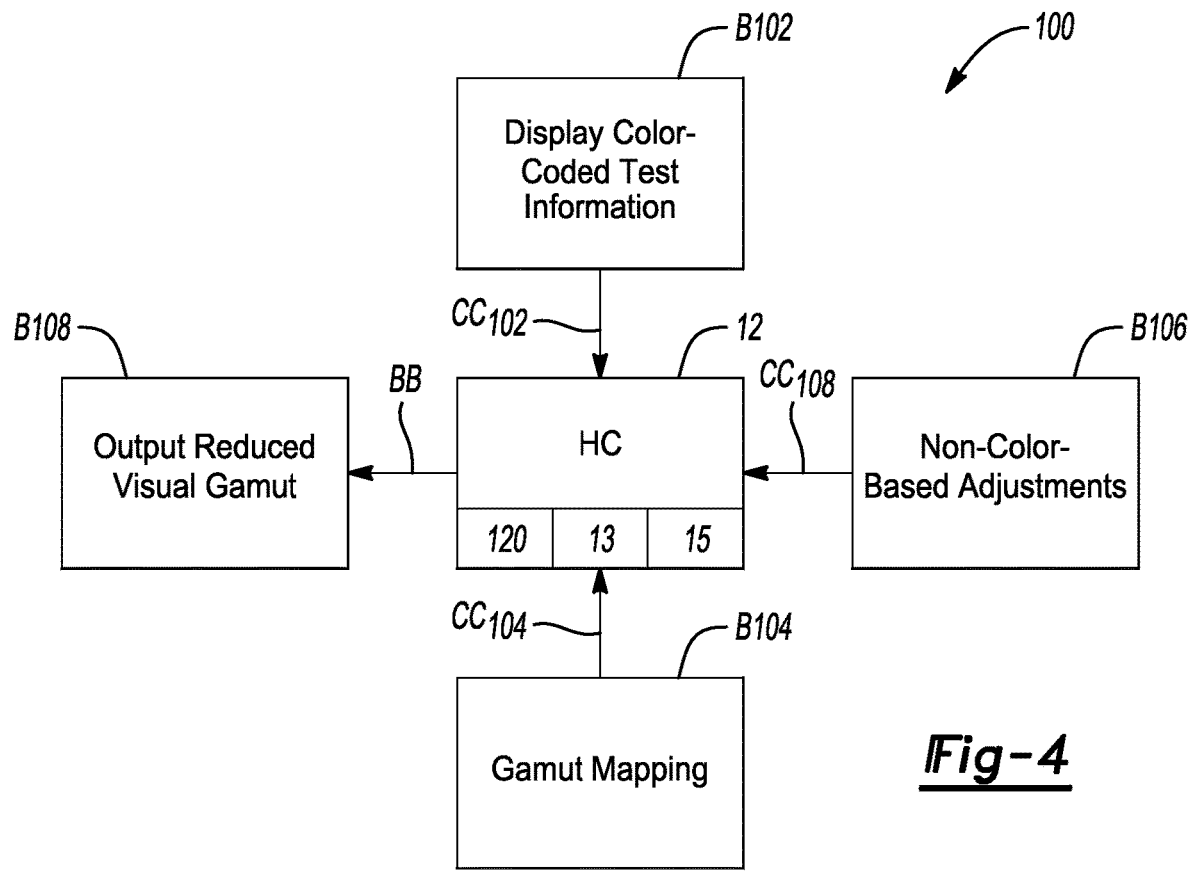
FIG. 4 is a schematic illustration of a system for providing enhanced color-based display aboard the motor vehicle of FIG. 1 for consumption by users having impaired or deficient color perception capabilities.

As an example of this, the red-yellow-green lighting scheme typically used throughout the developed world to illuminate traffic lights is also frequently used to indicate the relative status or criticality of certain in-vehicle visual alerts. A red symbol or graphic, for instance, may represent a system error requiring immediate service, while a green symbol or graphic may represent a properly working system. A yellow/amber symbol in turn could indicate a less urgent need for maintenance. However, users unable to accurately distinguish between displayed colors, for example in the standard red-green-blue (sRGB) color spectrum, may be unable to accurately perceive at least some of the information or grasp the importance thereof. The present solutions provide a solution to this potential problem by adapting displayed colors to the unique color perception capabilities of a given user via a multi-step color calibration method, an example of which is shown in FIG. 4. The derived user-specific results are ultimately used to control one or more display settings within the vehicle interior 20 via operation of the display controller 50.

As part of the present control strategy, the host computer (HC) 12 of FIG. 1 is equipped with one or more processors 13, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The host computer may include an associated computer-readable storage medium, i.e., non-transitory memory (M) 15 inclusive of read only, programmable read only, random access, a hard drive, etc., whether resident, remote or a combination of both. The host computer 12 also includes an interpreter block 120 whose function in the performance of the present display control strategy is set forth below with particular reference to FIG. 4.

As part of the present approach, a user having possible color perception deficiencies may access a software application ("app") 19, such as by opening the app 19 on the user device 14 and providing touch inputs to a color display screen 140. While the user device 14 is represented in FIG. 1 as a smart phone, those skilled in the art will appreciate that other access points could be used to open the app 19, including desktop, laptop, or tablet computers or an infotainment or navigation display screen located within the vehicle interior 20. After opening the app 19, the user is presented with one or more color-based queries, e.g., questions and/or sample graphics in different colors, color palettes, color wheels, etc. Such queries test or screen the user's ability to distinguish between displayed colors, such as but not including deficiencies such as red-green color blindness. The user's answers are treated herein as a color perception response (AA), which is then uploaded to the host computer 12, e.g., via a suitable internet or other network connection. The color perception response (AA) ultimately allows the host computer 12 to carefully map the user's color vision capabilities as a reduced color gamut 66 (see FIG. 5) using the method 100 described below with reference to FIG. 4.

In response to output signals BB from the host computer 12, which likewise may be communicated via a remote network connection, e.g., in cooperation with a vehicle telematics unit of the motor vehicle 10 shown in FIG. 1, the display controller 50 is able to adjust color display settings of one or more of the color display screens 22 located aboard the motor vehicle 10 to better accommodate the user's mapped color vision capabilities. Ultimately, users having unimpaired color vision could be presented with color-coded information having default sRGB settings, e.g., red icons to represent urgent or high-priority information, green icons to represent properly functioning systems, and yellow or amber icons to provide lower priority status updates or warnings. Users having verified color vision deficiencies, however, are instead presented with color-coded information from a different part of the RGB color spectrum and/or with a different non-color characteristic such as intensity, texture, size, frequency-modulated intensity, and/or font.

Similar to the configuration of the host computer 12 described above, the display controller 50 aboard the motor vehicle 10 is equipped with one or more processors 52, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The controller 50 may include an associated computer-readable storage medium, i.e., non-transitory memory 54 inclusive of read only, programmable read only, random access, a hard drive, etc., whether resident, remote or a combination of both. In response to the output signals BB from the host computer 12, the display controller 50 transmits display control signals to the various color display screens 22 of the vehicle interior 20.

Figure 2:
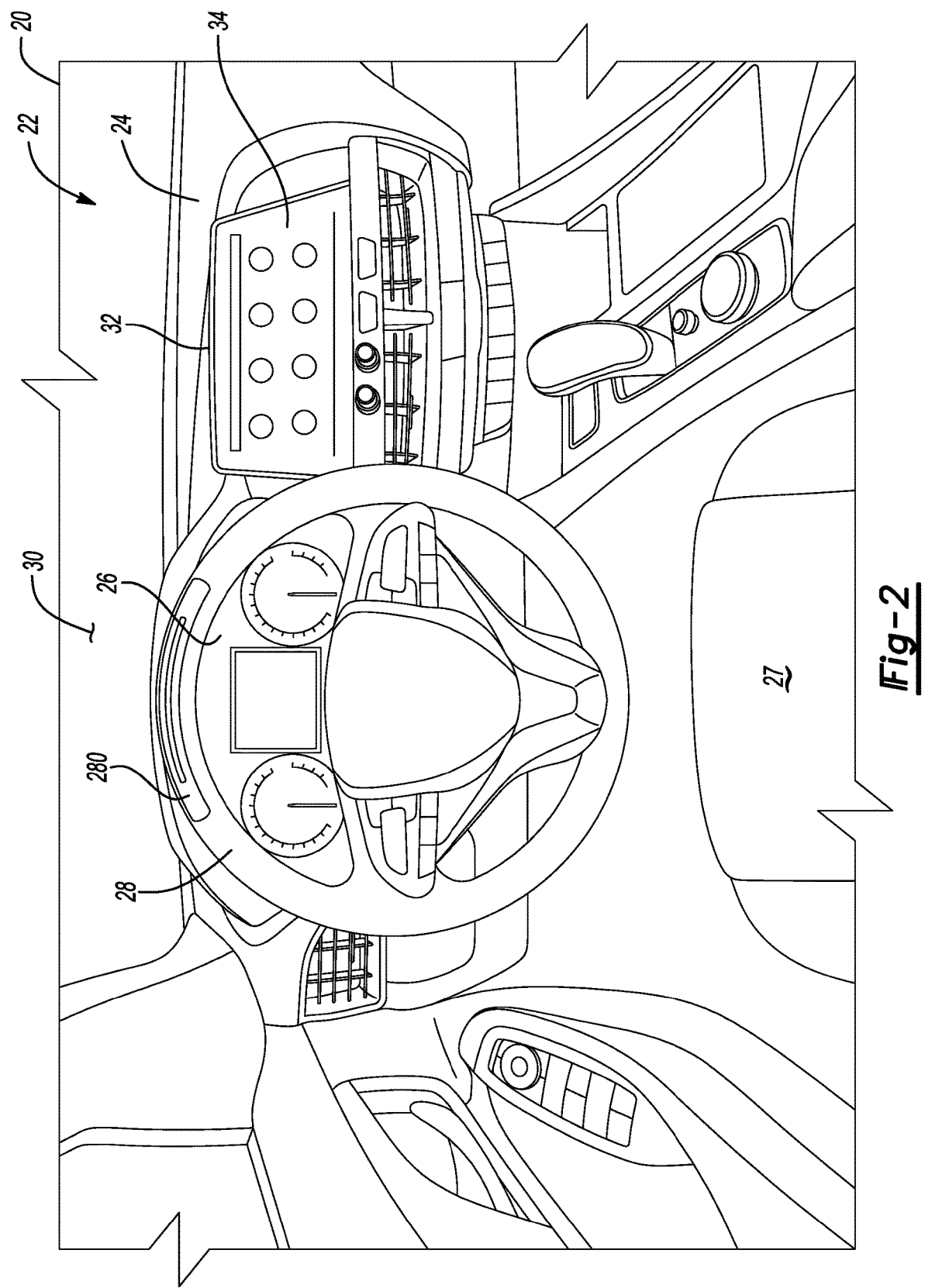
FIG. 2 is a representative embodiment of a vehicle interior of the motor vehicle shown in FIG. 1 illustrating exemplary color display screens.

Referring now to FIG. 2, the vehicle interior 20 in a possible embodiment includes a plurality of the color display screens 22. The particular locations and structural configurations of each of the color display screens 22 may vary with the particular construction of the vehicle interior 20. For example, the vehicle interior 20 may include a dashboard 24 and an instrument panel 26 adjacent thereto. A driver (not shown) situated in a driver seat 27 in a forward-facing position faces a steering wheel 28 and a windshield 30, with the dashboard 24 and the instrument panel 26 extending laterally across the vehicle interior 20.

In such a configuration, the color display screens 22 could include the windshield 30, e.g., via a heads-up display (HUD) system (not shown) embedded in or mounted to the dashboard 24. Likewise, the color display screens 22 could include an adjustable light bar 280 arranged on or embedded within/integrated with the steering wheel 28, and/or the instrument panel 26. A center stack 32 may house a touch screen 34, e.g., for presenting navigation or entertainment ("infotainment") information to users of the motor vehicle 10. Other surfaces not specifically mentioned herein could likewise be adapted for use as in-vehicle displays, such as a rear-view or side-view mirror (not shown), graphics displayed during reverse/backup/parking maneuvers, etc., and therefore the color display screens 22 of FIG. 2 are just some of the many possible surfaces whose colors and other characteristics may be selectively controlled by the display controller 50 of FIGS. 1 and 4 in response to receipt of the transmitted output signals BB of FIG. 1.

Figure 3:
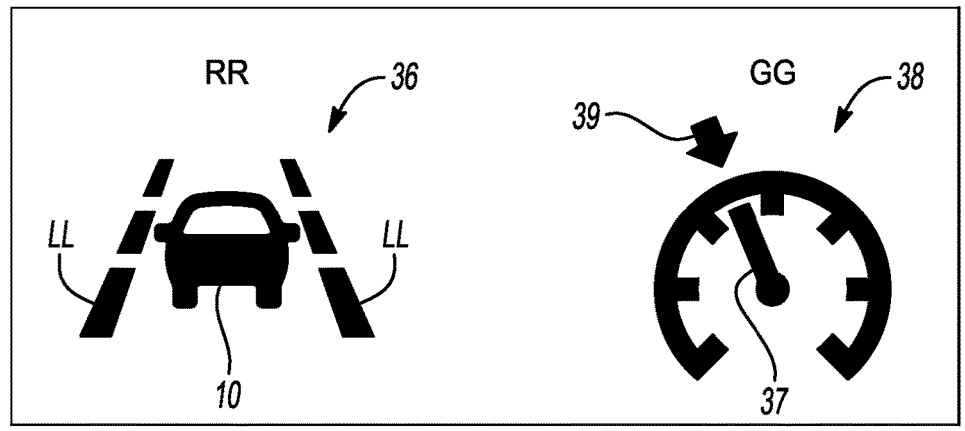
FIG. 3 is an exemplary pair of color-coded graphics that may be displayed via one or more of the color display screens of FIG. 2.

Referring briefly to FIG. 3, representative graphics 36 and 38 of the instrument panel 26 of FIG. 2 illustrate a possible appearance of color-coded information as contemplated herein. That is, color-coded information is often presented in graphical form as recognizable symbols to illustrate a particular vehicle system or function, possibly with supporting text. When viewing the graphic 36, for instance, a user would perceive that the information pertains to a lane keeping assist system, with characteristic boundary lines LL and a representative of the motor vehicle 10. Likewise, the graphic 38 depicts a typical cruise control symbol in which a needle 37 is shown set to a particular limit 39.

In this illustrative case, a user having impaired color vision could still likely perceive the graphics 36 and 38 and recognize the corresponding systems they represent. However, depending on the extent of the user's color vision deficiencies, the same user may be unable to perceive the importance or criticality of the displayed information. The graphic 36 may be illuminated in red (RR), for example, indicating that the user ought to take the motor vehicle 10 in for immediate service. In contrast, the graphic 38 could be illuminated in green (GG) to indicate that the cruise control function is working properly, is turned on, and is ready to receive the user's speed inputs. With pronounced red-green color blindness, however, such a user may not be able to perceive the urgency of graphic 36 in this representative illustration.

Referring to FIG. 4, the method 100 of the present disclosure enables off-line color calibration and automated real-time adjustment of color-coded information. The method 100 is intended to aid users in understanding color-coded information when presented within the vehicle interior 20 of FIG. 2 via the various color display screens 22, e.g., the above-described graphics 36 and 38 of FIG. 3. The proposed method 100 provides color vision-impaired users with the capability of resolving critical colors typically used in signaling, notifying, and informing the user of various aspects of operation of the motor vehicle 10.

The method 100 of FIG. 4 enables control of one or more of the color display screens 22 aboard the motor vehicle 10 of FIG. 1. FIG. 4 for clarity depicts the host computer 12 as a receiver of information from logic blocks B102, B104, and B106, and a provider of information to the display controller 50, in this instance with control signals BB serving as commands to adjust user-specific color settings as set forth below. An instruction set embodying the method 100 may be recorded on a non-transitory, computer-readable storage medium, e.g., the memory 15 of the host computer 12 and/or the memory 54 of the display controller 50 in different implementations. Executing the instruction set via a processor, such as the processor 13 and/or the processor 52, causes the processor 13, 52 to perform the method 100 in accordance with the disclosure.

In general, the method 100 includes performing, via the host computer 12, a color calibration test of a user of the motor vehicle 10 in which the user is subjected to a calibrated set of color-coded test information $CC_{102}$. The method 100 also includes receiving the user's color perception response AA to the calibrated set of color-coded test information $CC_{102}$ via the host computer 12, and mapping the reduced visual gamut 66 of the user via the host computer 12 using the color perception response AA. The host computer 12 ultimately outputs user-specific color settings to the controller 50, with the user-specific color settings corresponding to the reduced visual gamut 66. In this manner, execution of the method 100 helps to accommodate the user's color perception deficiencies.

Blocks B102, B104, and B106 of the method 100 are embodied as control logic, routines, code segments, or algorithms that are executed by the host computer 12 of FIG. 1, with aspects of block B108 possibly being performed by the display controller 50. Other embodiments may be conceived of in which the hardware of the host computer 12, the controller 50, and the user device 14 could be shared or used in a distributed manner without departing from the scope of the disclosure. For illustrative clarity, the method 100 will be described herein as being performed primarily by the host computer 12 as an entity separate from the display controller 50.

At block B102 ("Display Color-Coded Information"), the host computer 12 may display, via the user device 14 of FIG. 1, a calibrated set of color-coded test information $CC_{102}$ to a user whose color vision capabilities are being assessed. This action may entail displaying one or more of a color-coded graphic, symbol, icon, text, etc. The displayed test information $CC_{102}$ has a baseline color scheme, texture, and intensity, e.g., a symbol or graphic such as the representative graphics 36 and 38 of FIG. 3. Initially, the displayed test information $CC_{102}$ could be from the standard red-green-blue (sRGB) color palette, which is depicted at 64 in FIG. 5.

As part of block B102, the user may be subjected to a one-time or periodic color vision test during which the user is asked by the host computer 12 to select an optimal palette of colors, i.e., colors that are readily distinguishable from each other by the user, and that the user is able to accurately associate with color-specific meanings. As depicted in the plot 60 of FIG. 5, for example, the user could be shown colors from a full "normal" color gamut 62 or the sRGB gamut 64 of the various displays of the vehicle interior 20. Different colors or color combinations may be displayed via the user device 14 as a color wheel, or as different test graphics, text, etc., with the user's response to each displayed color/color combination being recorded by the host computer 12. Ultimately, the host computer 12 gathers data regarding the user's ability to accurately decipher the meaning of color-coded information when such information is presented to the user in alternative color schemes, intensities, sizes, fonts, etc. The user's color responses are then fed into the interpreter block 120 of the host computer 12.

Gamut Mapping/Daltonization:

During a calibration process, e.g., using the app, block B104 ("Gamut Mapping") includes performing a gamut mapping process to map out the user's reduced visual gamut 66 (FIG. 5) as a color map $CC_{104}$. As part of this process, the interpreter block 120 may convert the sRGB information from the test graphics used in block B102 and the user's specific responses to a user-specific LMS response, an example of which is shown in plot 70 of FIG. 6. As appreciated in the art, three cone types of the human eye have corresponding responsivity peaks at long (L), medium (M), and short (S) wavelengths of visible light, i.e., with plots of each shown as traces 72, 74, and 76 of FIG. 6, which depicts wavelength in nanometers (nm) on the horizontal axis and normalized amplitude (A) on the vertical axis.

The interpreter block 120 of the host computer 12 shown schematically in FIG. 4 is thus configured to take the user's response to the calibrated set of color-coded test information $CC_{102}$ at block B102 and calculate information loss per specific perception deficiency. The interpreter block 120 as part of block B104 may map the original colors of the intended graphic to a new color palette that is more easily perceived by the user. For instance, a Daltonization algorithm could be used, which as appreciated in the art utilizes color confusion lines to compensate for color vision impairments by shifting colors away from confusion lines toward colors that are visible to the user, e.g., by shifting red values toward the blue end of the color spectrum.

The interpreter block 120 then converts the LMS data for the user back to sRGB using a suitable color space conversion process. The color map $CC_{104}$ in the form of an adjusted color spectrum may be automatically saved, e.g., to memory 54 of the display controller 50, for a specific user as a calibrated value. Such a color map $CC_{104}$ is later applied by the display controller 50 within the vehicle interior 20 when the user is detected therein, or when the user selects the settings upon entering the vehicle interior 20. The saved information may be incorporated into the display control signals from the display controller 50 when later controlling the various color display screens 22 within the vehicle interior 20.

Block B106 ("Non-color-based Adjustments") may be used as part of the method 100 to account for non-color-based adjustments to improve visual perception of colors. That is, the reduced color gamut 66 of FIG. 5 as identified by the user's responses at block B102 in some instances may not be sufficiently large to generate at least three distinct discernable colors. In such instances, the color gap may be filled by using alternate icons or graphics, or using textures made of the pseudo color space identified at block B104. Such modified icons/symbols/graphics will be understood by the user as an alternate signage formulation $CC_{106}$.

As a non-color-based adjustment using the alternate signage formulation $CC_{106}$, the host computer 12 could, for a given user, store an illumination control setting for the adjustable light bar 280 shown in FIG. 2 so as to produce a longer and/or wider illuminated portion/length for better visibility, or a brighter or slower/more rapid pulsating response. Similarly, displayed icons or graphics could be enlarged for better visibility, or text-based messages could be displayed in a different and/or larger font alone or in conjunction with color control. Block B106 therefore includes selectively augmenting the reduced visual gamut 66 via the host computer 12 using non-color-based information.

Figure 5:
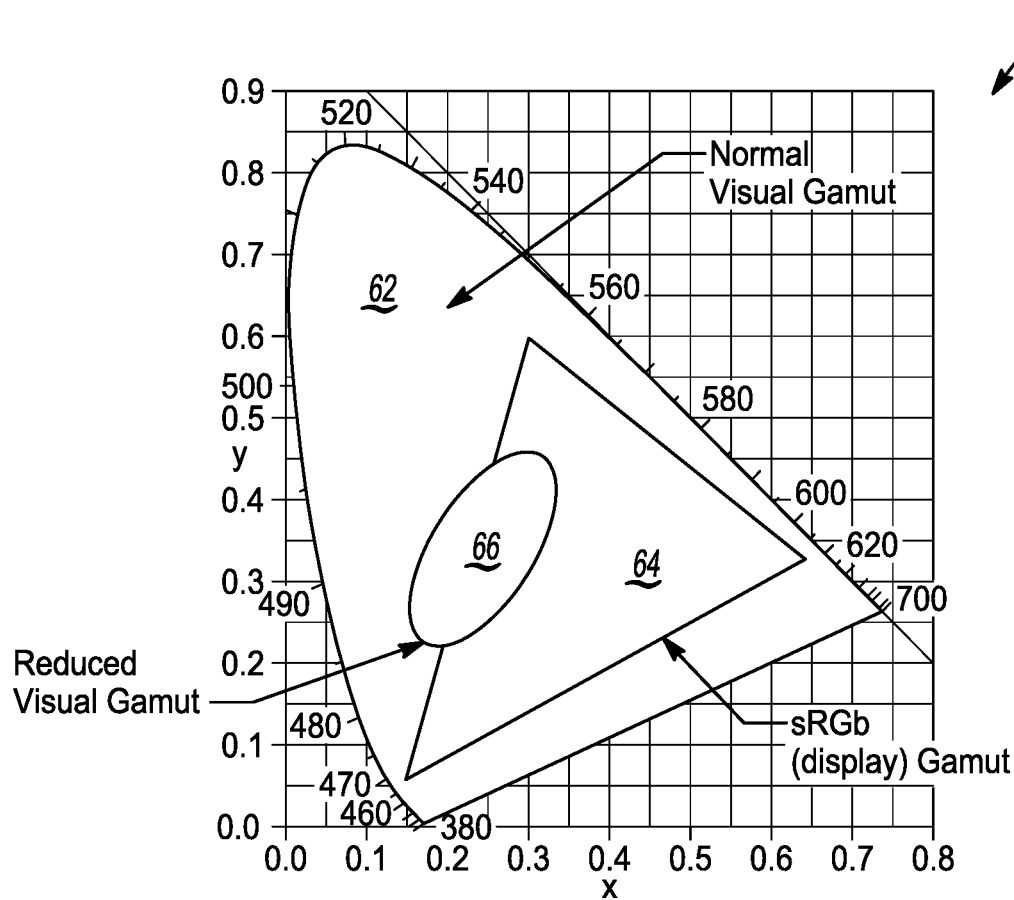
FIG. 5 illustrates various visual gamut of a possible user of the motor vehicle shown in FIG. 1.
Figure 6:
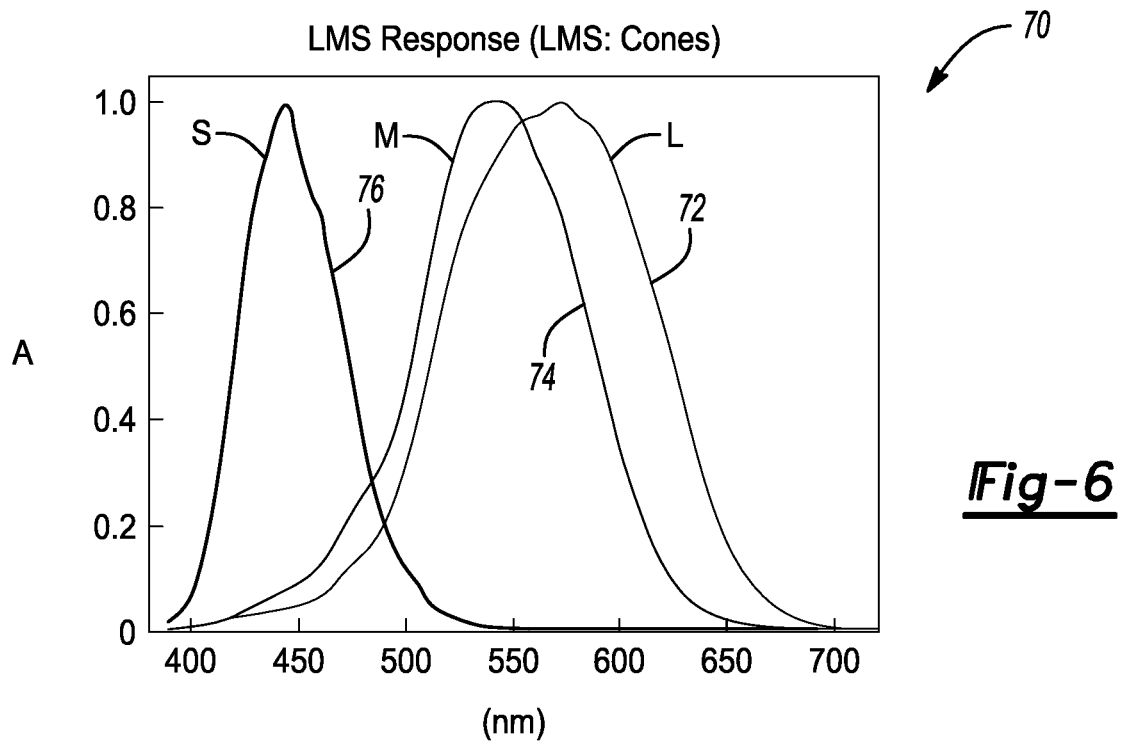
FIG. 6 is an LMS response diagram showing long (L), medium (M), and short (S) wavelengths and normalized amplitudes.

Block B108 ("Output Reduced Visual Gamut") for its part includes outputting the reduced visual gamut 66 of FIG. 5 as part of transmitting the output signals BB by the host computer 12, with the output signals BB requesting an adjustment to one or more color settings of the color display screen(s) 22. The display controller 50, which ultimately receives the output signals BB, is configured to thereafter incorporate the reduced visual gamut 66 when outputting the display control signals to the display screen(s) 22. That is, the method 100 in some embodiments may continue with adjusting the user-specific color settings of the color display screen(s) 22 in response to the output signals BB from the host computer 12. The color settings are thus made user-specific by operation of the method 100, thereby accounting for a given user's color perception deficiencies. As part of block B108, the display controller 50 may detect the user upon entering the vehicle interior 20, e.g., using biometric identifiers, RFID, or simply by having the user select a setting from a menu. Upon detection, the display controller 50 may select stored settings from its memory 54 and, using the processor 52, may begin displaying information in the user's optimal color scheme.

The teachings set forth above recognize that automotive vehicles such as the motor vehicle 10 of FIG. 1 display color information, with the color at times imparting meaning to the displayed information. Color-impaired users are often unable to fully discern the meaning of the displayed color-coded information, at least to the extent of the urgency or criticality associated with the color. The solutions of the present disclosure provide an alternate display process adapted for individual color-impaired users, with the display controller 50 ultimately adjusting settings of standard display information into a format or color palette that is more readily perceived by the color-impaired user. These and other attendant benefits will be appreciated by those skilled in the art in view of the disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for controlling a color display screen in a vehicle interior, comprising:
performing, via a host computer, a color calibration test of a potential user of the vehicle interior in which the user is subjected to a calibrated set of color-coded test information, the color-coded test information including colors in a standard red, green, blue (sRGB) gamut;
receiving, via the host computer, a color perception response of the user to the calibrated set of color-coded test information;
mapping a reduced visual gamut of the user via the host computer using the color perception response of the user, including:
converting the sRGB gamut and the color perception response of the user to a user-specific long, medium, short (LMS) response;
mapping the colors in the sRGB gamut to a new color palette using the LMS response; and
converting the new color palette back to the sRGB gamut using a color space conversion process;
identifying a color gap in which the reduced color gamut is not sufficiently large to generate at least three distinct discernable colors;
filling the color gap using icons, text, and/or graphics as an alternate signage formulation;
transmitting output signals to a display controller to command (i) an adjustment of user-specific color settings of the display screen using the reduced visual gamut and (ii) display of the alternate signage formulation, and to thereby accommodate a color perception deficiency of the user.

2. The method of claim 1, further comprising:
adjusting the user-specific color settings of the display screen in response to the output signals.

3. The method of claim 1, wherein performing the color calibration test includes presenting the calibrated set of color-coded test information to the user via a user device in remote communication with the host computer.

4. The method of claim 3, wherein presenting the calibrated set of color-coded test information to the user via the user device includes displaying a sequence of color-coded graphics or images on a display screen of the user device.

5. The method of claim 1, wherein mapping the colors in the sRGB gamut to a new color palette is performed using a Daltonization algorithm.

6. The method of claim 1, further comprising:
selectively augmenting the reduced visual gamut via the host computer using non-color-based information; and
outputting non-color-based settings as part of the output signals in conjunction with the user-specific color settings, the non-color-based settings including the non-color-based information.

7. The method of claim 6, wherein the non-color-based information includes one or more of a size, a shape, or a font.

8. The method of claim 1, wherein the vehicle interior includes a steering wheel having an adjustable light bar, and wherein transmitting the output signals to the display controller includes requesting an adjustment to a longer, wider, and/or pulsating response setting of the adjustable light bar for filling the color gap.

9. The method of claim 1, wherein the vehicle interior includes an instrument panel or cluster, and wherein transmitting control signals to the display controller includes requesting an adjustment to a color setting of information displayed via the instrument panel or cluster.

10. The method of claim 1, wherein the color display screen includes an infotainment display screen, and wherein transmitting the output signals to the display controller includes requesting an adjustment to a color setting and/or a length setting of information displayed via the infotainment display screen.

11. The method of claim 1, wherein transmitting the output signals to the display controller includes storing user-specific color settings in a memory device of the display controller.

12. A non-transitory, computer-readable storage medium on which is recorded an instruction set executable by a processor, wherein executing the instruction set causes the processor to:
perform a color calibration test of a potential user of a vehicle interior during which the user is subjected to a calibrated set of color-coded test information, the color-coded test information including colors in a standard red, green, blue (sRGB) gamut;
receive a color perception response of the user to the calibrated set of color-coded test information;

map a reduced visual gamut of the user using the color perception response, including:
 converting the sRGB gamut and the color perception response of the user to a user-specific long, medium, short (LMS) response;
 mapping the colors in the sRGB gamut to a new color palette using the LMS response; and
 converting the new color palette back to the sRGB gamut using a color space conversion process;
identify a color gap in which the reduced color gamut is not sufficiently large to generate at least three distinct discernable colors:
fill the color gap using icons, text, and/or graphics as an alternate signage formulation;
command (i) an adjustment of user-specific color settings of one or more color display screens within the vehicle interior using the reduced visual gamut, and (ii) a display of the alternate signage formulation, to thereby accommodate a color perception deficiency of the user.

13. The non-transitory, computer-readable storage medium of claim 12, wherein executing the instruction set causes the processor to perform the color calibration test by presenting the calibrated set of color-coded test information to the user via a user device in remote communication with the processor.

14. The non-transitory, computer-readable storage medium of claim 13, wherein executing the instruction set causes the processor to present the calibrated set of color-coded test information to the user via the user device by displaying a sequence of color-coded symbols or graphics via the user device.

15. The non-transitory, computer-readable storage medium of claim 14, wherein the sequence of color-coded symbols or graphics includes standard red, green, blue (sRGB) symbols or graphics.

16. The non-transitory, computer-readable storage medium of claim 12, wherein executing the instruction set causes the processor to map the colors in the sRGB gamut to a new color palette using a Daltonization algorithm.

17. The non-transitory, computer-readable storage medium of claim 12, wherein executing the instruction set causes the processor to:
 selectively augment the reduced visual gamut using non-color-based information; and
 output non-color-based settings to the display controller in conjunction with the user-specific color settings, wherein the non-color-based information includes one or more of a size, shape, font, intensity, or texture, the non-color-based settings including the non-color-based information.

18. A method of controlling a color display screen in a vehicle interior, comprising:
 performing, via a host computer, a color calibration test of a potential user of the vehicle interior in which the user is subjected to a calibrated set of color-coded test information, the color-coded test information including colors in a standard red, green, blue (sRGB) gamut, including presenting the calibrated set of color-coded test information to the user via a display screen of the vehicle interior or a user device in remote communication with the host computer, the color-coded test information including standard red, green, blue (sRGB) symbols or graphics;
 receiving, via the host computer, a color perception response of the user to the calibrated set of color-coded test information;
 mapping a reduced visual gamut of the user via the host computer using the color perception response and a Daltonization algorithm, including:
  converting the sRGB gamut and the color perception response of the user to a user-specific long, medium, short (LMS) response;
  mapping the colors in the sRGB gamut to a new color palette using the LMS response; and
  converting the new color palette back to the sRGB gamut using a color space conversion process;
 identifying a color gap in which the reduced color gamut is not sufficiently large to generate at least three distinct discernable colors;
 filling the color gap using icons, text, and/or graphics as an alternate signage formulation; and
 commanding (i) an adjustment of user-specific color settings of the color display screen using the reduced visual gamut, and (ii) a display of the alternate signage formulation, to thereby accommodate a color perception deficiency of the user.

19. The method of claim 18, further comprising:
 selectively augmenting the reduced visual gamut via the host computer using non-color-based information, wherein the non-color-based information includes one or more of a size, a shape, or a font; and
 outputting non-color-based settings to the display controller in conjunction with the user-specific color settings, the non-color-based settings including the non-color-based information.

20. The method of claim 18, wherein the motor vehicle includes an instrument panel, and wherein adjusting the user-specific color settings of the display controller includes adjusting a color setting of information displayed via the instrument panel, and wherein commanding an adjustment to the user-specific color settings of the vehicle interior includes storing user-specific color settings in a memory device of a display controller of the vehicle interior.

* * * * *